INVENTOR.
HAROLD E. FROEHLICH
BY
Louis Sheldon
ATTORNEY

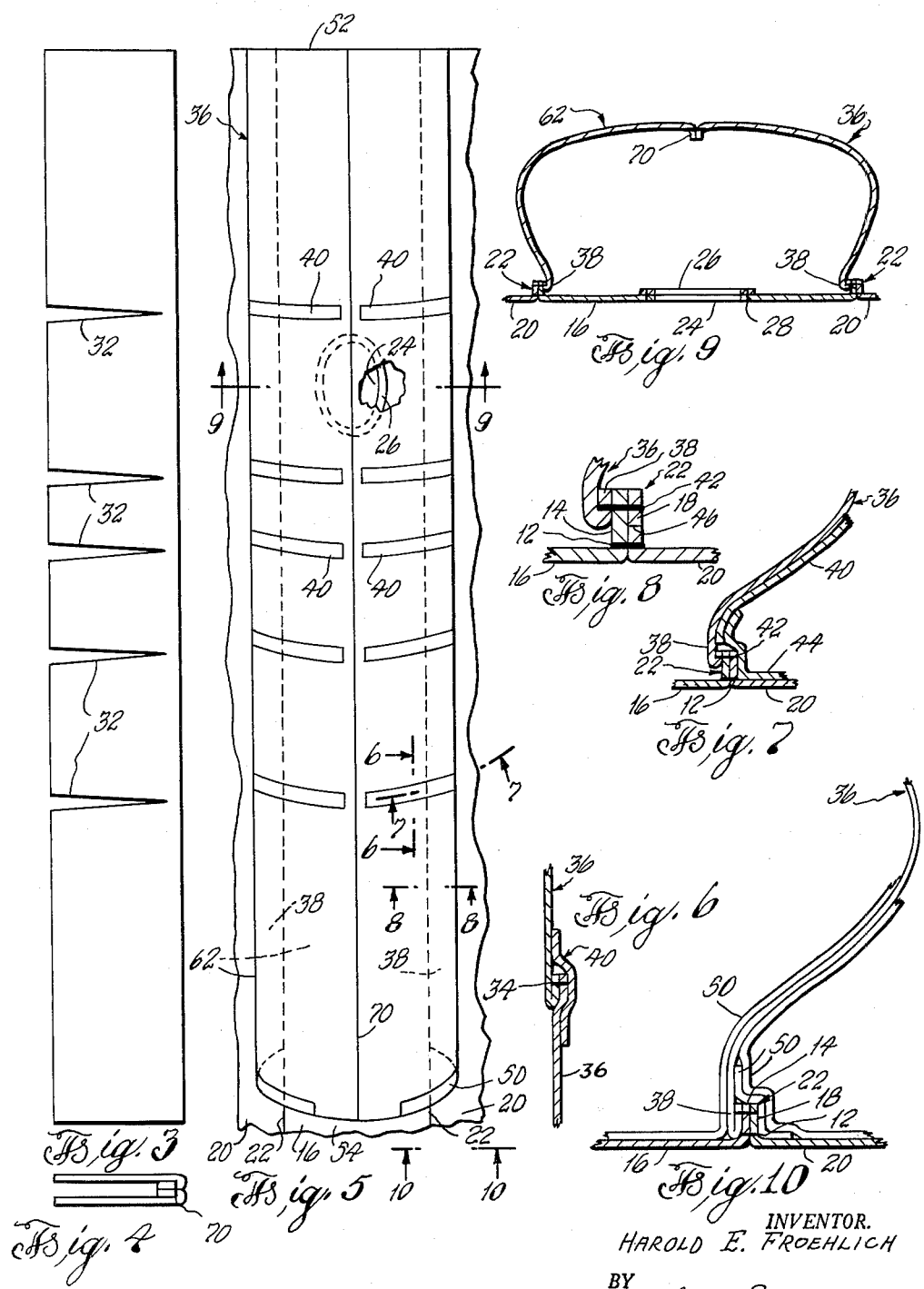

June 26, 1962 H. E. FROEHLICH 3,041,019
VALVING DUCT BALLOON
Filed Oct. 31, 1960 4 Sheets-Sheet 4
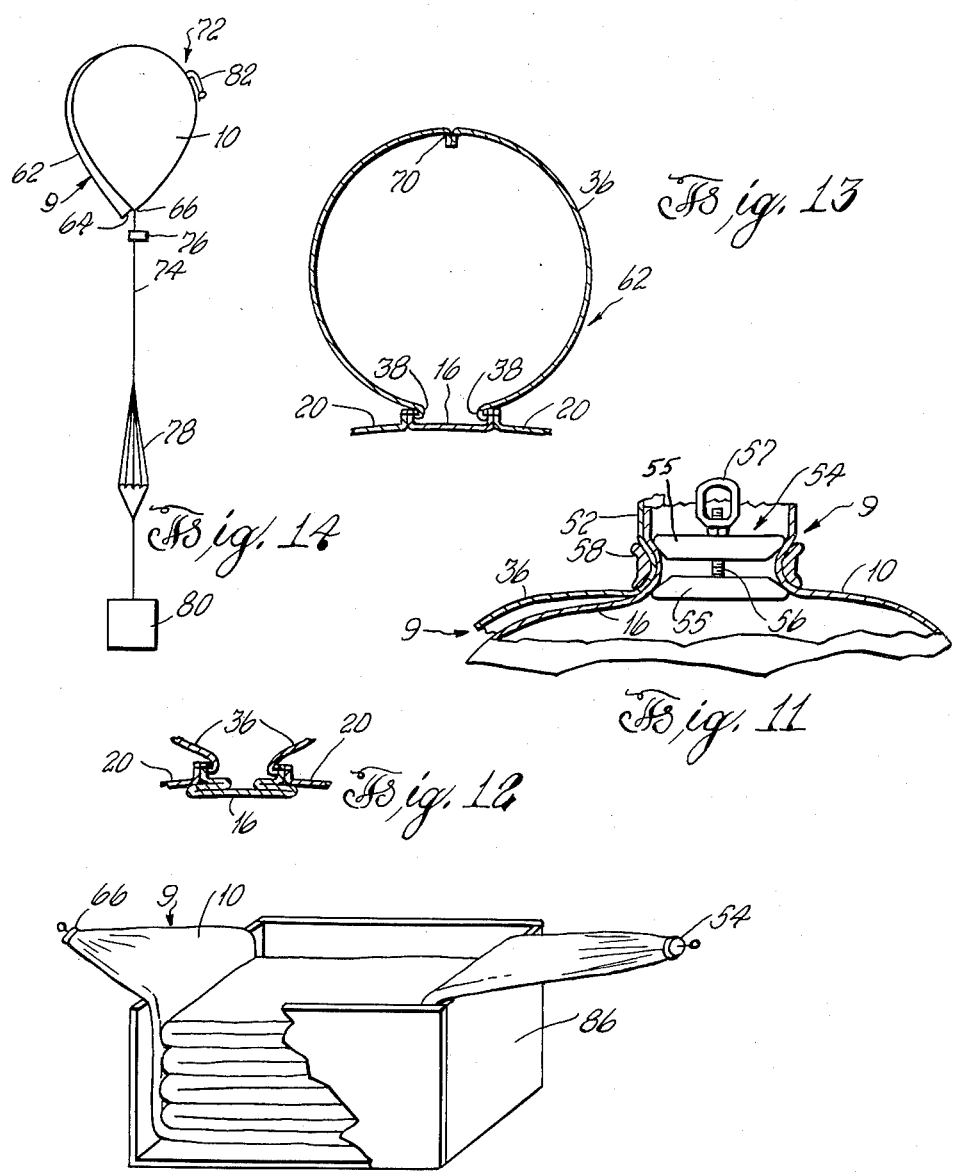
INVENTOR.
HAROLD E. FROEHLICH
BY
Louis Sheldon
ATTORNEY United States Patent Office 3,041,019
Patented June 26, 1962

3,041,019
VALVING DUCT BALLOON
Harold E. Froehlich, Minneapolis, Minn., assignor, by mesne assignments, to the United States of America as represented by the Secretary of the Navy
Filed Oct. 31, 1960, Ser. No. 66,368
15 Claims. (Cl. 244—99)

This invention relates to free high altitude inelastic plastic film balloons and is concerned more particularly with the valving of lift gas therefrom.

When launched, a free inelastic plastic balloon designed to float at a predetermined ceiling altitude is only slightly inflated with helium or other lift gas. As the balloon system rises, the gas expands and proceeds gradually to fill out the balloon. Inasmuch as the balloon is inelastic, further tendency of the gas to expand after the balloon is fully inflated results in increased gas pressure which might excessively strain or burst the balloon. To guard against this possibility, provision is made for automatically valving gas from the balloon.

The automatic valving of the gas under such conditions has been achieved by an open bottom balloon. This arrangement, although satisfactory for the above-noted purposes, has the disadvantage of allowing atmospheric air to enter the balloon, with consequent reduction in the altitude at which it is capable of floating.

The disadvantage of the open bottom balloon has been overcome by closing the bottom of the balloon, forming the balloon with a hole in the upper part thereof, and clamping to the balloon about the hole the upper end of an outside duct extending along and connected at longitudinally spaced points to the balloon. However, such a structure in flight has the disadvantage, among others, of obstructing air flow past the balloon envelope, which causes material flutter to such an extent as to impose undue stresses on the envelope and duct at the attachment points.

It is an object of the invention to provide a valving duct balloon having the advantages and free of the disadvantages of prior valving duct balloons.

A more particular object is to provide a valving duct which is an integral part of the balloon.

A further object is to provide a valving duct balloon of the gored type in which the duct is connected to the remainder of the balloon at gore seams.

It is also an object to provide a valving duct balloon in which the balloon envelope forms a part of the duct.

Another object is to provide a duct, all of whose components are of flexible materials to facilitate packaging of the balloon into a small box.

Further objects and advantages of the invention will appear as the description proceeds.

The invention will be better understood on reference to the following description and the accompanying more or less schematic drawing, wherein:

FIG. 3 is an elevational view of one side of a panel about to be formed into a channel.

FIG. 4 is a bottom plan view of the panel.

FIG. 5 is an elevational view of the channel attached to the balloon envelope to provide a duct.

FIGS. 6 to 9 are enlarged sectional views taken at 6—6, 7—7, 8—8, and 9—9, respectively, in FIG. 5.

FIG. 10 is an enlarged bottom view taken at 10—10 in FIG. 5.

FIG. 11 shows the top portions of the envelope and duct channel closed by a top fitting.

FIG. 12 is a sectional view taken at 12—12 in FIG. 1 when the duct channel is used with a gored cylinder balloon envelope.

FIG. 13 is similar to FIG. 12 but shows the channel applied to a tailored gore balloon envelope.

FIG. 14 is a schematic view of a balloon system embodying the invention.

FIG. 15 is a somewhat schematic view showing how the balloon may be packaged in a small box.

Figure 1:
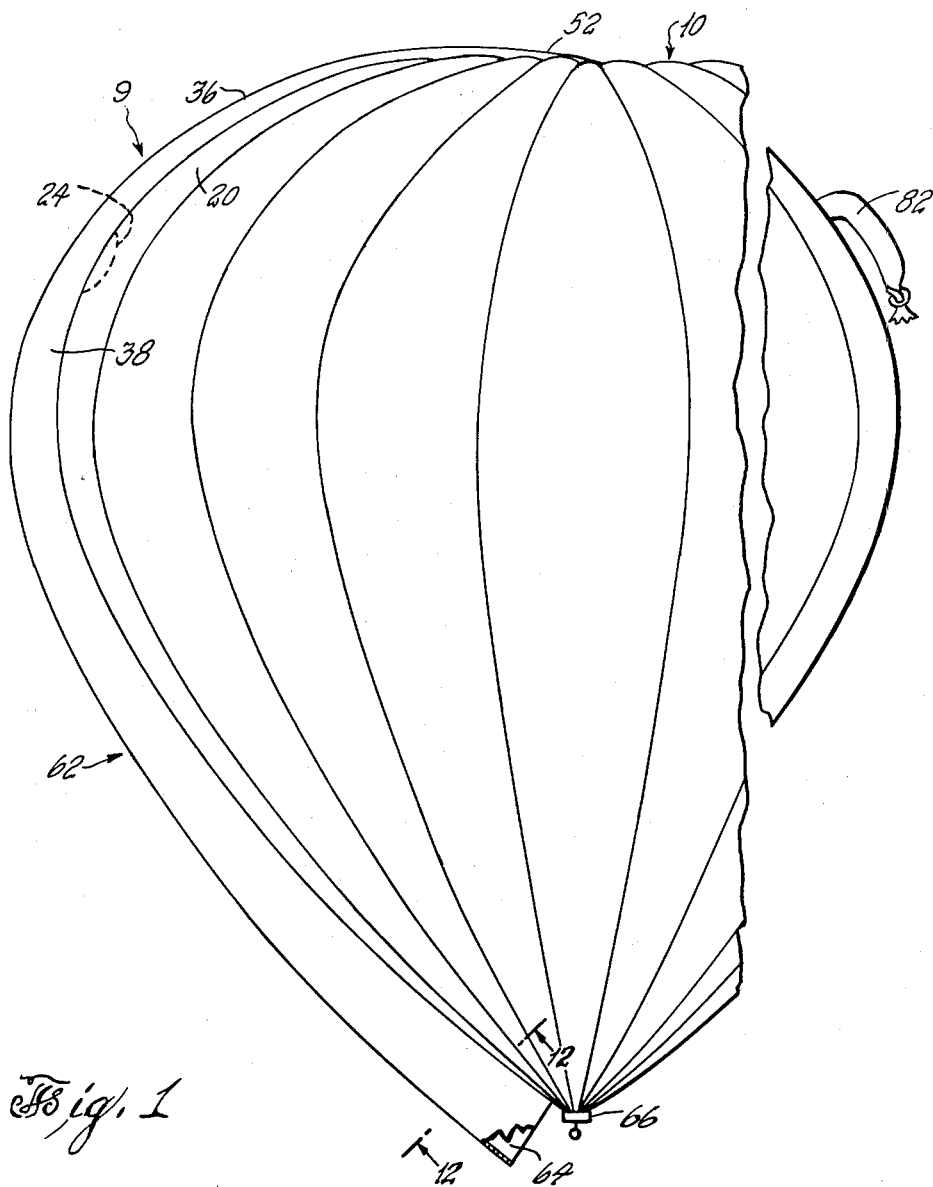
FIG. 1 is a side elevational view of a balloon constructed in accordance with the invention.

Referring now more particularly to the drawing, disclosing an illustrative embodiment of the invention, there is shown at 9 a balloon comprising an envelope 10 formed of gores marginally continuously heat-sealed at 12 throughout their lengths. The heat-seal 12 (FIG. 8) joining each margin 14 of the gore 16 to the adjacent margin 18 of each of the two flanking gores 20 provide external fins 22 each of sufficient width to receive a second line of heat sealing, as will appear. The gore 16 has a hole 24 (FIGS. 1, 5 and 9) which is preferably elliptical and to whose peripheral margin an endless reinforcing flexible tape 26 is continuously circumferentially heat-sealed as at 28.

A rectangular sheet of substantially greater than gore width is V-notched at 32 (FIG. 3) at suitable intervals at both sides, and the margins defining each notch are heat-sealed together at 34 (FIG. 6) to impart to the remaining material the shape of a suitably longitudinally curved channel 36, which is of least length at its margins 38, for a reason which will appear. The notch margins thus sealed are protected by adhesive tapes 40 (FIGS. 5 to 7). If desired, instead of resorting to notching, the sides of the sheet could be tuck-gathered at such intervals and the gathered material heat-sealed to provide the same shape of channel. The channel 36 is placed along and outside the gore 16, and each channel margin 38 is turned outward, placed against the corresponding gore margin 14, and heat-sealed continuously thereto and to the adjacent flanking gore margin 18 along a line 42 (FIG. 8). Adhesive tapes 44 (FIG. 7) forming extensions of the tapes 40 are applied to the fins 22 and adjacent portions of the gores 20. Each gore margin 18 is slit as at 46 (FIG. 8) at suitable intervals therealong between the seal lines 12 and 42 to provide access to the atmosphere of air that might otherwise be trapped in the fins 22 between the seal lines. If a tape 44 overlies a part of the margin 18 to be slit, the tape will of course have a registering slit. Such air, if trapped, would naturally tend to expand on ascent of the balloon and could rupture the balloon. Protective adhesive taping 50 (FIGS. 5 and 10) is applied to the bottom end or base of the channel 36 and the adjacent portions of the gores 16 and 20.

The upper end portion 52 (FIGS. 1, 5, and 11) of the channel 36 is gathered with the upper end portion 53 of the envelope 10, and these portions are clamped as by a top end fitting 54 which not only closes the top of the envelope but also closes the top of the channel against the envelope. The fitting 54 may comprise inner clamping means including opposed frusto-conical members 55, a screw 56 fixed to one member and passing through the other and engaged with a clamping nut 57, and an outer and complementary double frusto-conical ring 58. The gore 16 and channel 36 thus together constitute an integral duct 62 which is closed except at the gore hole 24 and at the base 64 of the duct. The bottom end portion of the envelope 10 is gathered and clamped and closed as by a bottom end fitting 66 (FIGS. 1 and 2) which may be like the top fitting 54.

When the envelope 10 is fully inflated, it has substantially the longitudinal contour noted (FIG. 1). With the top 52 of the channel 36 closed against the top of the envelope 10, the channel, in order to receive gas from the envelope and be billowed out by the gas to its maximum cross-sectional area, must be of least length at its margins 38 and of maximum length midway of its width, where, when subject to superpressured gas, it will be farthest from the gore 16 in every plane which is normal to the gore and intersects the gore in a horizontal line, and the channel must be of progressively reduced length in longitudinal lines progressively closer to its margins. This variation in length is required because of the fact that, of two arcs of different radii subtending the same angle, the arc of greater radius is necessarily the longer arc. If the channel were made of a rectangular sheet, then, with the margins sealed to the gore margins and the material at one end closed against the top of the envelope 10, and the envelope inflated, the gas pressure in the envelope would hold the remainder of the duct panel substantially flat adjacent the envelope, so that in practical effect there would be no duct.

The channel 36 is tailored to the envelope with which it is to function. The longitudinal contour of a given fully inflated balloon envelope is predetermined, and the channel 36 therefor can be designed to accommodate itself to that contour to insure proper performance of the duct.

Figure 2:
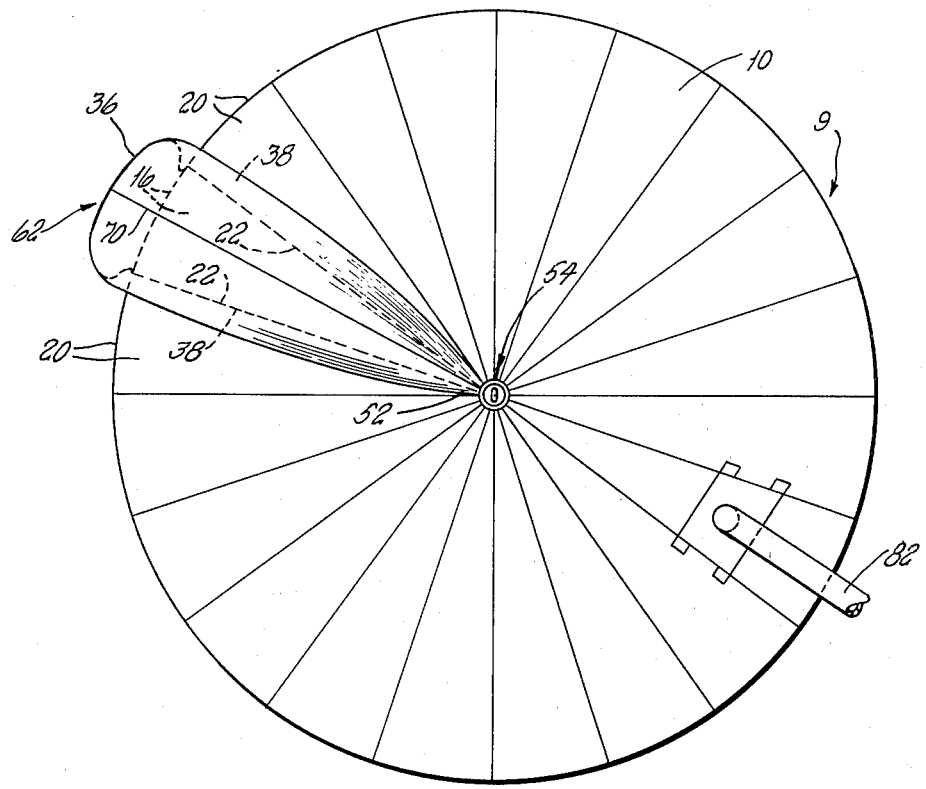
FIG. 2 is a top plan view of FIG. 1 on a reduced scale.

If the channel 36 is applied to a balloon envelope formed of a cylindrical tube made up of rectangular gores and gathered at top and bottom, the envelope when fully inflated will assume a "natural" aerostatic shape, and the radial lines in FIG. 2 and the lines of the envelope extending up and down from the equator (FIG. 1) will represent the folds of the gathered material, the envelope being of course ungathered at the equator. FIG. 12 applies to such an envelope.

If the channel 36 is applied to a balloon envelope whose gores are tailored, i.e., widest at the equator and progressively narrow up and down from the equator, to assume, without gathering, substantially a "natural" aerostatic shape when fully inflated, then the several lines referred to in the next preceding paragraph will represent the longitudinal seams of the envelope. FIG. 13 applies to such an envelope.

The envelope 10 and duct channel 36 are made of thin inelastic plastic balloon film such that, if thermoplastic, such as polyethylene, layers can be heat-sealed directly, and, if of Mylar, for example, two layers can be united as by an intervening strip of a material obtainable on the market and which, when heated, becomes bonded to the layers.

The duct channel 36 is of a width to provide the duct 62 with sufficient fulness of film so that, when inflated, the duct will have at least the minimum cross-sectional area to enable gas issuing from the envelope hole 24 to flow without restraint down the duct and out of the duct base 64 when the pressure within the envelope at the horizontal plane of the duct base exceeds the ambient atmospheric pressure at that plane. This minimum can be readily computed in accordance with standard balloon valving duct design practice. Film about nine feet wide is commonly used in the making of gores for high altitude balloons. A channel 36 formed of two such widths marginally united as at 70 (FIGS. 2, 5, 9, and 13) to provide a film width of about 18 feet will afford at least the minimum duct girth needed in many cases.

A balloon system embodying a valving duct in accordance with the invention is shown schematically at 72 in FIG. 14. A load line 74, secured to the bottom fitting 66, passes through and supports an electrically fired or other suitable line cutter 76 and suspends a parachute 78 which suspends a load 80 comprising flight controls (not shown) together with equipment (not shown) for sampling high altitude air or for observing, gathering and/or telemetering meteorological, cosmic ray, or other scientific phenomena. The system also includes an inflation tube such as an inelastic balloon film tube 82 (FIGS. 1, 2, and 14) whose upper end is secured as by heat-sealing and taping to the envelope 10 about a hole (not shown) in the envelope.

The envelope 10 at the ground is inflated to a small fraction of its capacity with helium or other lift gas to provide a net buoyancy or free lift which will carry the the balloon system 72 at the desired speed and to the desired ceiling altitude, and then the inflation tube is cut and knotted on itself to close it. Then, when all of the equipment to be carried aloft is attached, the balloon system 72 is launched. As the balloon system 72 rises, the gas expands and proceeds gradually to fill out the envelope 10 and the duct 62. When the gas at any horizontal plane through a balloon envelope is at the same pressure as the ambient atmosphere at that plane, such gas is considered to be at "zero relative pressure." At planes above and below the zero pressure plane, the gas is respectively "superpressured" and "subpressured." Because of the subpressure, the part of the envelope below the zero pressure plane will be sucked in and hence puckered. When the balloon is at ceiling altitude the duct base 64 is at the zero pressure plane. In the event that the balloon is at ceiling altitude and the gas becomes superheated, as by solar radiation, the gas will tend to expand and, inasmuch as the film is inelastic, the gas will tend to shift the zero pressure plane downward, so that gas will valve down out of the duct base 64, and this loss of gas will continue until the zero pressure plane is restored to the duct base 64. In the event that the gas cools, as at sunset, the gas will contract and hence the zero pressure plane will rise, allowing atmospheric air to enter the duct 62 up to the new zero pressure level, and the balloon will descend. The hole 24 is however located high enough to preclude access of air to the hole, so that no air can enter the envelope 10. The descent may terminate at sunrise or be terminated by the dropping of a suitable amount of ballast (not shown). On subsequent ascent and corresponding expansion of the gas, the air in the duct 62 will be forced down the duct as the zero pressure plane is lowered.

The duct channel 36 being seamed continuously throughout its longitudinal margins 38 to the envelope 10, and being connected to the envelope only at longitudinal seams of the envelope and independently of the envelope hole leading to the duct, it follows that the duct is an integral part of the balloon and hence is as strong as the balloon itself and does not provide appreciable sail area and hence will not appreciably obstruct the flow of ambient air past the envelope nor will it twist, wave, flutter, or foul, or impose any appreciable stress on the envelope.

In the case of the "cylinder" balloon, when the bottom fitting 66 is installed, the lower part of the channel 36 is held ungathered so that it can open fully (FIG. 12) during flight.

The seams 12 and 42 could be coincident, in which case the slits 46 would be obviated. However, to place the seam 42 directly over the seam 12 throughout the length of the balloon would require a degree of care which would unduly prolong and increase the cost of manufacture. It is much more convenient in manufacturing not to be required to exercise such care during the second seaming operation at each fin 22, so that, wherever the second seam happens to be spaced from the first seam, slitting 46 is resorted to.

For a 42,000 cu. ft. balloon an elliptical hole 24 dimensioned 22½" by 13" is suitable. For balloons of greater volume the hole will be correspondingly larger.

The top and bottom fittings 54 and 66 are only a few inches in outside diameter. For a larger balloon the fittings need not be substantially larger. When the balloon is packed as in a box 86 (FIG. 15), the balloon is folded so that the fittings are on top, and, since the fittings are relatively small and all of the material between the fittings is film and therefore flexible, the balloon can be packed quickly and in a small box. A substantially larger box would be required for the prior ducted balloon to accommodate the clamping means by which the upper end of the duct is secured about the hole in the envelope, and extra care would be required to protect the delicate film material from injury from the clamping means during the packaging, while the balloon is in the box, when it is being removed from the box, and in the preparation for launching.

The films and tapes are shown in exaggerated thickness for convenience. Generally the thickness may be a fraction of a mil to a few mils, as the circumstances may require.

Obviously many modifications and variations of the invention are possible in the light of the above teachings. It is therefore to be understood that within the scope of the appended claims the invention may be practiced otherwise than as specifically described.

I claim:
1. A balloon comprising a lift gas envelope formed of limp inelastic film, an elongated panel of limp inelastic film whose longitudinal margins are respectively united to the respective longitudinal margins of a substantially narrower portion of the envelope extending from an upper part of the envelope to a lower part of the envelope and forming with said portion a flexible duct, and means closing the top of the duct, said portion having a hole substantially above the bottom of the duct, the bottom of said piece being connected only to the envelope, the bottom of the duct being unsealed to allow gas to be expelled from the balloon.

2. The structure of claim 1, characterized in that the duct has at least a predetermined girth from the hole downward.

3. The structure of claim 1, characterized in that the envelope when fully inflated has a substantially natural aerostatic shape.

4. In a high altitude balloon, a lift gas envelope formed of a plurality of inelastic limp film gores extending from top to bottom of the envelope, one of the gores having a perforation in the upper part thereof below the top of the envelope, an elongated inelastic limp film channel outside of the envelope and covering the perforate gore, the longitudinal margins of the channel being united with the respective margins of the perforate gore and extending from the top of the perforate gore to a level above the bottom of the envelope and substantially below the perforation, the channel being longitudinally shaped to the predetermined longitudinal contour of the envelope throughout the length of the channel when the envelope is fully inflated down to the level of the bottom of the channel, the channel and perforate gore together constituting a duct open at the bottom of the channel, means closing the top of the duct and the top of the envelope, and means closing the bottom of the envelope.

5. The structure of claim 4, characterized in that all of the gores are rectangular and gathered at the top and bottom of the envelope, and the top of the channel is gathered with the top of the envelope.

6. In a high altitude balloon, a lift gas envelope comprising gores extending from top to bottom of the envelope, each adjacent pair of gore margins being united by a seam extending from top to bottom of the envelope, one of the gores having a perforation, a channel covering the perforate gore from a level above the perforation to a level substantially below the perforation, the channel bottom being disposed above the envelope bottom, each of the pairs of margins defining the perforate gore being united with a margin of the channel by a seam extending throughout the length of the channel margin, the perforate gore and the channel together constituting an integral duct open at the bottom, and means closing the upper end of the duct.

7. The structure of claim 6, characterized in that the two seams at each side of the perforate gore are spaced apart, one of the gore margins so seamed having a longitudinal series of perforations between the two seams thereat.

8. The structure of claim 6, characterized in that the two seams at each side of the perforate gore are spaced apart, each gore margin seamed to a margin of the perforate gore having a longitudinal series of perforations between the two seams thereat.

9. In a high altitude balloon, an inelastic film lift gas envelope having an upper hole below the top of the envelope, an inelastic film channel outside the envelope and covering the hole and united throughout its longitudinal margins with the envelope and extending from the top of the envelope, the bottom of the channel being disposed substantially below the hole and above the bottom of the envelope, the channel and the portion of the envelope covered by the channel below the top constituting a duct communicating with the interior of the envelope at the hole and open to the atmosphere at the bottom of the channel, means closing the bottom of the envelope, the top portion of the envelope film defining an opening, an inner clamping member plugging the opening, an outer clamping member about the top portions of the envelope film and channel film, and means clamping the members against the intervening envelope and channel film to close the tops of the envelope and channel.

10. The structure of claim 1, characterized in that the envelope is closed except for said hole.

11. The structure of claim 1, characterized in that the bottom of the envelope is closed.

12. A balloon comprising a lift gas envelope, a channel secured to the envelope and covering a portion of the envelope extending from an upper part of the envelope to a lower part of the envelope and forming with said portion a flexible duct, and means closing the top of the duct, said portion having a hole substantially above the bottom of the duct, the bottom of the duct being unsealed to allow gas to be expelled from the balloon, said portion being one of a plurality of gores constituting the envelope, the channel being united with the respective longitudinal margins of said portion.

13. The structure of claim 12, characterized in that the duct has at least a predetermined girth from the hole downward.

14. The structure of claim 12, characterized in that the envelope and channel are formed of inelastic film, and the channel has a minimum longitudinal curvature enabling it to conform to the longitudinal contour of said portion regardless of the extent of inflation of the envelope.

15. The structure of claim 12, characterized in that the envelope when fully inflated has a substantially natural aerostatic shape.

References Cited in the file of this patent

UNITED STATES PATENTS 909,397     Godefroy  --------------  Jan. 12, 1909